(12) United States Patent
Arunachalam (10) Patent No.: US 12,026,091 B2
(45) Date of Patent: Jul. 2, 2024

(54) ORTHOGONAL MEMORY LANE-BASED MEMORY MANAGEMENT

(71) Applicant: HEWLETT PACKARD ENTERPRISE DEVELOPMENT LP, Houston, TX (US)

(72) Inventor: Somasundaram Arunachalam, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 172 days.

(21) Appl. No.: 17/644,615

(22) Filed: Dec. 16, 2021

(65) Prior Publication Data

US 2023/0195613 A1      Jun. 22, 2023

(51) Int. Cl.
*G06F 12/02*      (2006.01)

(52) U.S. Cl.
CPC .... *G06F 12/023* (2013.01); *G06F 2212/1016* (2013.01)

(58) Field of Classification Search
CPC .................. G06F 12/023; G06F 2212/1016
See application file for complete search history.

(56) References Cited

U.S. PATENT DOCUMENTS

| | | | |
|---|---|---|---|
| 7,370,296 B2 * | 5/2008 | Koyfman | G06F 11/2257 716/106 |
| 7,555,566 B2 | 6/2009 | Blumrich et al. | |
| 7,831,804 B2 | 11/2010 | Pappalardo et al. | |
| 8,645,350 B2 * | 2/2014 | Greene | G06F 16/36 707/706 |
| 9,158,540 B1 | 10/2015 | Tzelnic et al. | |
| 9,286,261 B1 | 3/2016 | Tzelnic et al. | |
| 9,652,568 B1 | 5/2017 | Tzelnic et al. | |
| 9,734,063 B2 | 8/2017 | Novakovic et al. | |
| 10,445,451 B2 | 1/2019 | Fleming et al. | |
| 2004/0024729 A1 * | 2/2004 | Worley | G06F 12/10 |
| 2005/0132089 A1 | 6/2005 | Bodell et al. | |
| 2005/0278702 A1 * | 12/2005 | Koyfman | G06F 11/2257 717/124 |
| 2013/0173667 A1 * | 7/2013 | Soderberg | G06T 11/206 707/798 |
| 2013/0304775 A1 | 11/2013 | Davis et al. | |

(Continued)

OTHER PUBLICATIONS

Keeton, Kimberly; "Memory-Driven Computing"; Hewlett Packard Enterprise; 2017; 61 pp.

(Continued)

*Primary Examiner* — Francisco A Grullon
(74) *Attorney, Agent, or Firm* — Sheppard Mullin Richter & Hampton LLP (57) ABSTRACT

A technique includes allocating, by a memory manager, a first region of a memory. The allocation includes selecting a logically contiguous first lane of the memory. The first lane is associated with a first identifier. The allocation further includes selecting a logically contiguous second lane of the memory. The second lane is a child of the first lane, and the second lane is orthogonal to the first lane. The second lane is associated with a second identifier. The technique includes, responsive to a request to access the first region, managing, by the memory manager, the access to the first region based on the first identifier and the second identifier.

20 Claims, 8 Drawing Sheets

(56) References Cited

U.S. PATENT DOCUMENTS

| | | | |
|---|---|---|---|
| 2015/0278397 A1* | 10/2015 | Hendrickson | G06F 16/9024 |
| | | | 707/798 |
| 2016/0299874 A1 | 10/2016 | Liao | |
| 2017/0046272 A1* | 2/2017 | Farmahini-Farahani | ..................... |
| | | | G06F 12/1408 |
| 2018/0074965 A1* | 3/2018 | Aguilera Diez | G06F 12/0862 |
| 2022/0091765 A1* | 3/2022 | Wang | G06F 3/067 |

OTHER PUBLICATIONS

Keller, Axel; "Anatomy of a Resource Management System for HPC Clusters"; Paderborn Center for Parallel Computing; Paderborn, Germany; 2001; 23 pp.

\* cited by examiner

FIG. 3 — Table 300

| MAIN LANE ADDRESS (304) | PHYSICAL START ADDRESS (308) | MAIN LANE REGION (312) | | MAIN LANE SIZE (320) |
|---|---|---|---|---|
| | | VIRTUAL ADDR START OFFSET (313) | VIRTUAL ADDR END OFFSET (315) | |
| 0x00000001 | 0x7B1C24BD | 0x000 | 0x3E8 | 1000 GB |
| 0x00000002 | 0x7B1C28A6 | 0x000 | 0x6A4 | 1700 GB |

FIG. 4 — Table 400

| SUBLANE (404) | SUBLANE ADDRESS (408) | SUBLANE REGION | | SUBLANE SIZE (416) |
|---|---|---|---|---|
| | | PHY ADDR START (413) | PHY ADDR END (414) | |
| 210-1 | {(0x00000001), 0x000001} | 0x7B1C24BD+200 GB | 0x7B1C24BD+50 GB | 50GB |
| 210-2 | {(0x00000001), 0x000002} | 0x7B1C24BD+250 GB | 0x7B1C24BD+50 GB | 50GB |
| 210-3 | {(0x00000001), 0x000003} | 0x7B1C24BD+350 GB | 0x7B1C24BD+200 GB | 200GB |
| 210-4 | {(0x000001,0x000003), 0x000001} | 0x7B1C24BD+370 GB | 0x7B1C24BD+150 GB | 150GB |
| 210-5 | {(0x000001,0x000003,0x000001), 0x000001} | 0x7B1C24BD+380 GB | 0x7B1C24BD+10 GB | 10GB |
| 210-6 | {(0x000001,0x000003,0x000001), 0x000002} | 0x7B1C24BD+390 GB | 0x7B1C24BD+80 GB | 80GB |
| 210-7 | {(0x000001,0x000003,0x000001,0x000002), 0x000001} | 0x7B1C24BD+400 GB | 0x7B1C24BD+10 GB | 10GB |
| 210-8 | {(0x000001,0x000003,0x000001,0x000002), 0x000002} | 0x7B1C24BD+410 GB | 0x7B1C24BD+10 GB | 10GB |
| 210-9 | {(0x000001,0x000003,0x000001,0x000002), 0x000003} | 0x7B1C24BD+430 GB | 0x7B1C24BD+10 GB | 10GB |

ORTHOGONAL MEMORY LANE-BASED MEMORY MANAGEMENT

BACKGROUND

A computer system may include a memory manager (e.g., an operating system-resident memory manager) to allocate memory for executing programs from a pool of free, or unused, memory; manage access to allocated memory; and return allocated memory to the pool of free memory when no longer used. The computer system may have a virtual memory space, which is an abstraction of the computer system's physical memory space. The virtual memory space may be beneficial for a number of different reasons. For example, the virtual memory space may hide data fragmentation of the physical memory. As another example, a virtual memory space allows the computer system to have a relatively smaller physical memory space by swapping data between physical memory and secondary storage.

DETAILED DESCRIPTION

A computer system may execute a distributed application across multiple compute nodes, and for this purpose, the compute nodes may access a memory that is shared among the compute nodes. As an example, the computer system may be a cluster. In this context, a "cluster" refers to a group of interconnected compute nodes, which combine their individual processing powers to function as a single, high-performance machine. A cluster may be used for a number of different purposes, such as load balancing, high availability (HA) server applications, and parallel processing. The "compute node" may take on one of many forms, such as a computer platform (e.g., a blade server, a laptop, a router, a rack-based server, a supercomputer and so forth), a subpart of a computer platform (e.g., a compute node corresponding to one or multiple processing cores of a blade server or rack-based service), or multiple computer platforms. Moreover, a given compute node may itself be a cluster of compute nodes.

A computer system may have a processor-centric architecture in which compute nodes are the center of the architecture. In the processor-centric architecture, local memories of the compute nodes may be shared by the compute nodes. In this context, a "local memory" of a compute node refers to a memory that is dedicated to the compute node, such that the compute node controls access to the memory. As an example, the local memory may be a memory dedicated to one or multiple central processing unit (CPU) cores of the compute node. The sharing of local memories in a computer system having a processor-centric architecture may place limits on big data applications (e.g., applications associated with space exploration, genome study, earth sciences, computational chemistry, and so forth), in which the computer system may be tasked with processing relatively large volumes of data (e.g., petabytes, exabytes and zettabytes, if not larger volumes of data). For example, big data applications may involve analyzing tens to thousands of relatively large (e.g., 100 GB, if not larger) files. Compute nodes accessing non-local memories may introduce a considerable overhead in processing such large volumes of data. More specifically, a first compute node accessing a second compute node's local memory may involve the first compute node requesting access to the local memory of the second compute node, and the second compute node managing the request. Accordingly, a significant amount of work in a computer system having a processor-centric architecture may be devoted to moving data among local memories.

As an alternative to the processor-centric architecture, a computer system, such as a memory-oriented distributed computing system (or "memory driven computing system"), may have a memory-oriented architecture in which a shared pool of memory is the center of the architecture. More specifically, in the memory-oriented architecture, relatively high bandwidth fabric connects each compute node to a shared pool of memory, thereby allowing the shared pool of memory to be equally shared by the compute nodes. With the memory being equally shared, considerably less overhead may be incurred moving data into and out of memory, as compared to the processor-centric architecture. Accordingly, the memory-oriented architecture may be relatively more beneficial for big data applications.

An orchestrator computer system in such a memory-oriented architecture may have a memory manager that allocates memory, deallocates memory and manages memory accesses for various entities (e.g., threads, processes, applications, containers, virtual machines, compute nodes and so forth) of the computer system itself and/or devices connected to the memory fabric of the memory-oriented compute ecosystem. The computer system itself may have a virtual memory, and the memory manager may employ virtual memory management to manage the mapping between a virtual memory address space and a physical memory address space. For example, one approach to managing virtual memory involves the use of a page table-based virtual memory management scheme. With page table-based virtual memory management, a requestor may submit a request to access (e.g., read or write) a memory location. The virtual memory address contains bits that represent a virtual page number and an offset. Using the virtual page number as an index in a page table, the memory manager may identify a particular physical memory address frame. Using the offset, the memory manager may identify a specific physical memory location within the physical memory address frame, which corresponds to the virtual memory address.

A traditional virtual memory management scheme may be well-suited for a computing environment that has a relatively small number (e.g., ten to hundreds) of threads and has a relatively small amount of shared memory (memory in the scale of terabytes or lower). However, traditional virtual memory management schemes may encounter challenges for a high-performance computing (HPC) environment or a supercomputing environment (e.g., an exascale cluster), which may have thousands of threads and a significantly larger shared memory (e.g., a shared memory having a size on the order of petabytes, exabytes, or even zettabytes). Moreover, a HPC or supercomputing environment that is based on memory-oriented architecture may encounter challenges managing memory across heterogenous compute systems that are connected to the memory fabric.

In accordance with example implementations that are described herein, a computer system uses a virtual memory management scheme (also called a "memory lane-based virtualization" herein) in which virtual memory is allocated in hierarchical memory lane structures. The hierarchical memory lane structure includes one or multiple memory lanes that are arranged pursuant to a hierarchical order (as described herein). The number of memory lanes and sizes of the individual memory lanes of a given hierarchical memory lane structure are scalable.

The memory lane, in accordance with example implementations, is "flat," i.e., the memory lane corresponds to a contiguous, or noninterrupted (or nonlinear), region of virtual memory. Stated differently, the memory lane is a region of virtual memory that has a corresponding contiguous, or noninterrupted, range, or set, of virtual memory addresses. This contiguous range of virtual memory addresses may or may not correspond to a contiguous set of physical memory locations in which the data corresponding to the virtual memory addresses is stored. Moreover, in accordance with example implementations, the memory lane structure is also flat, in that the memory lane structure corresponds to a contiguous region of virtual memory.

More specifically, in accordance with example implementations, a memory manager, responsive to a memory allocation request, allocates a virtual memory lane structure for one or multiple entities from an unused pool of virtual memory. The memory manager may further increase the size and/or change the structure of the virtual memory lane structure in response to additional allocation request(s). Responsive to the memory lane structure being wholly or partially no longer used, the memory manager may deallocate the entire virtual memory lane structure or deallocate part of the virtual memory lane structure. The deallocated virtual memory may then be returned back to the unused pool of virtual memory.

The virtual memory lane structure, in accordance with example implementations, may be organized as a hierarchy of one or multiple flat virtual memory lanes. More specifically, in accordance with example implementations, the memory lane structure may be organized as a hierarchical tree of memory lanes, including a "main memory lane" and one or multiple additional memory lanes, called "memory sublanes" herein. A main memory lane and a memory sublane are both examples of "memory lanes." The main memory lane corresponds to the root node of the hierarchical tree. The one or multiple memory sublanes are descendants of the main memory lane and correspond to other non-root nodes of the hierarchical tree. In this context, a "descendant" of a memory lane, such as the main memory lane, refers to a direct descendent, or child, of the memory lane, as well as an indirect descendent (e.g., a grandchild or great grandchild) of the memory lane. A given memory sublane may correspond to a leaf node and have no children, and another given memory sublane may be a parent to one or multiple children.

In accordance with example implementations, the memory manager assigns a set of contiguous virtual memory addresses to a memory lane structure. If the memory lane structure has no memory sublanes (i.e., the memory lane structure has a main memory lane and no other memory lanes), then the main memory lane has the same set of contiguous virtual memory addresses. If, however, the memory lane structure has one or multiple memory sublanes, then one or multiple subsets of contiguous virtual memory addresses are reserved (or "carved out") from the set of contiguous virtual memory addresses assigned to the memory lane structure. In general, a contiguous set of virtual memory addresses for a child is reserved from the child's parent. In this context, an address being "reserved" from a parent means that the address is no longer part of the parent's assigned set of contiguous virtual memory addresses but rather, the address is now assigned to the child. Therefore, a child of a given memory lane (i.e., a main memory lane or memory sublane) may be reserved a corresponding set of contiguous virtual memory addresses from the given memory lane's assigned a set of contiguous virtual memory addresses; a grandchild of the given memory lane may be reserved a set of contiguous virtual memory addresses from the set of contiguous virtual memory addresses assigned to the child; a great grandchild of the given memory lane may be reserved a set of contiguous virtual memory addresses assigned to the grandchild; and so forth.

Due to the above-described way in which the virtual memory addresses for a child are reserved from the parent, the child and parent are orthogonal to each other. In this context, a first memory lane being "orthogonal" to a second memory lane refers to no overlap existing between the contiguous set of virtual memory addresses that are assigned to the first memory lane and the contiguous set of virtual memory addresses that are assigned to the second memory lane. Moreover, due to none of the assigned sets of virtual memory addresses overlapping, in accordance with example implementations, all of the memory lanes of the memory lane structure are orthogonal with respect to each other.

Therefore, in accordance with example implementations, the memory manager allocates a set of contiguous virtual memory addresses to a given memory lane structure, and the memory manager assigns subsets of this set of contiguous virtual memory addresses to the memory lanes of the memory lane structure. Moreover, in accordance with example implementations, all memory lanes of the memory lane structure are orthogonal to each other.

In accordance with example implementations, the memory manager may allocate the memory lanes of a particular memory lane structure at different times. For example, in accordance with some implementations, the memory manager may first allocate a memory lane structure for a particular entity, and this memory lane structure may contain a single memory lane, i.e., the main memory lane. At a later time, the memory manager may allocate child sublanes from the main memory lane of this memory lane structure. At yet one or multiple later times, in accordance with example implementations, the memory manager may further allocate additional memory lanes (e.g., child lanes from existing memory lanes). The additional allocation of memory lanes within a given memory lane structure may be based on the memory use criteria of the entity associated with the memory lane structure, and moreover, the criteria may change over time. Accordingly, depending on how the memory criteria changes, the memory manager may add lanes, or deallocate lanes of the memory lane structure.

The range of virtual memory addresses for a given memory lane may or may not correspond to a contiguous range of physical memory locations. In this manner, in accordance with some implementations, although a given memory lane is associated with a set of contiguous virtual memory addresses, the corresponding data for the given memory lane may be stored in multiple, noncontiguous physical memory locations. Therefore, in accordance with some implementations, one or multiple physical memory devices may store the data for a particular memory lane, and the range of contiguous virtual memory addresses for the memory lane may correspond to multiple physical memory addresses distributed across these memory devices. In accordance with example implementations, a set of physical memory devices for a given memory lane may vary by type, or category and may be part of the centralized memory fabric in a typical memory-oriented or memory-oriented distributed computing architecture.

In accordance with example implementations, a requestor may submit a request (e.g., a read or write request) to access a virtual memory address that falls within the range of virtual memory addresses that are assigned to a particular memory lane structure. Responsive to the request, the memory manager translates the virtual memory address to a physical memory address. As part of this translation, the memory manager may identify a corresponding memory lane structure and further identify a particular memory lane of the memory lane structure. As described further herein, in accordance with example implementations, for these purposes, the memory manager may use a data structure, such as a data structure that represents a directed acyclic graph that corresponds to the hierarchical organization of the memory lane structure.

In accordance with example implementations, memory lane-based virtualization that is described herein may be a superset virtual memory management scheme. In this regard, in accordance with some implementations, within a particular memory lane, the memory manager may apply another memory management technique (e.g., a page table-based or library-based memory management technique).

Figure 1:
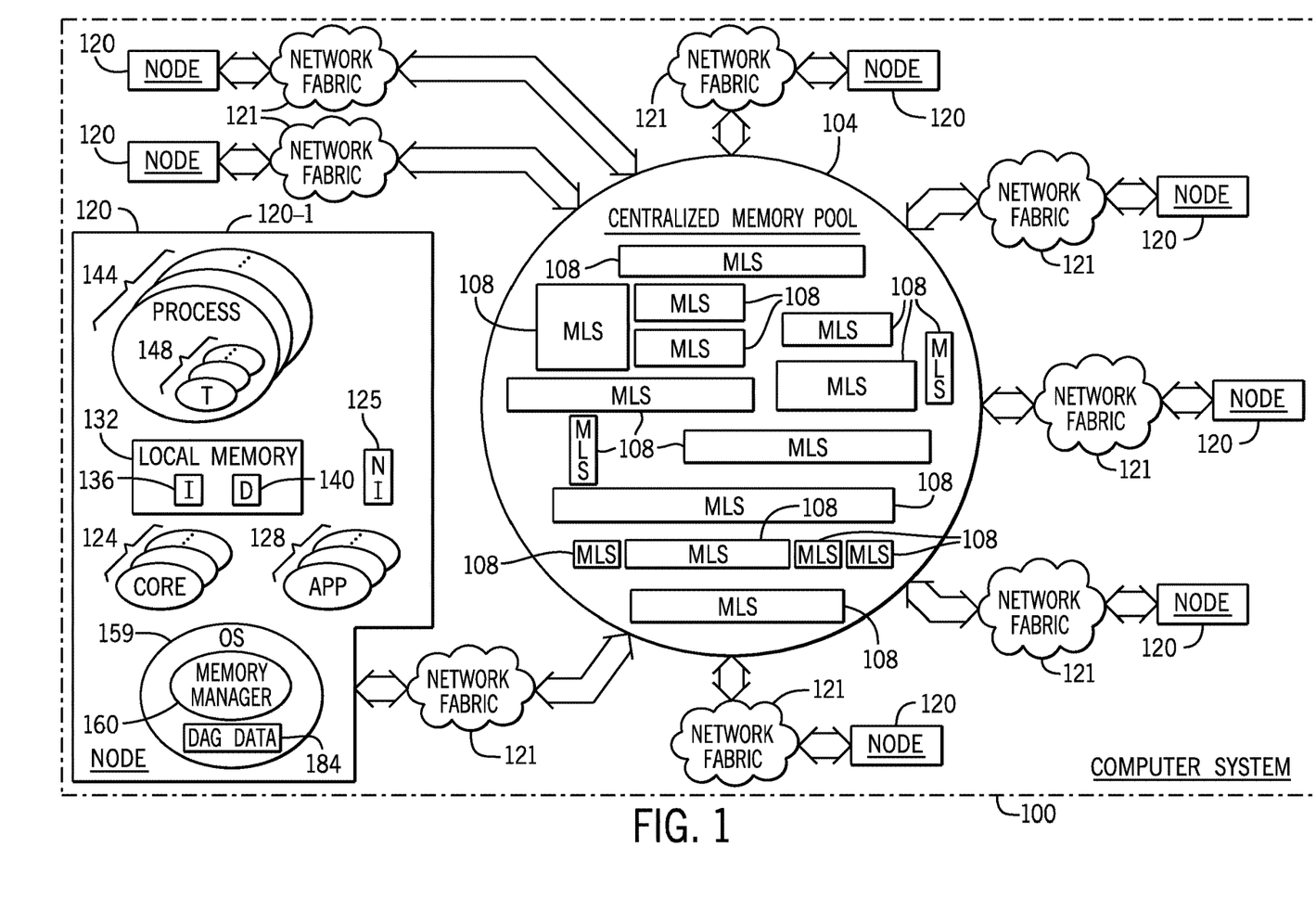
FIG. 1 is a schematic diagram of a memory-oriented distributed computing system having a centralized memory pool that includes hierarchical memory lane structures that include scalable, flat virtual memory lanes according to an example implementation.

Referring to FIG. 1, in accordance with example implementations, a computer system 100, such as a memory-oriented computing system or a memory driven computing system, includes nodes 120 and a centralized memory pool 104, which is shared by the nodes 120. In accordance with example implementations, the nodes 120 may access the memory pool 104 via relatively high bandwidth network fabric 121, such as Gen-Z fabric or other network fabric. In accordance with example implementations, the memory pool 104 is abstracted, or virtualized, by a memory manager 160. The memory pool 104 may include physical storage devices that corresponds to a heterogeneous or a homogeneous collection of physical, non-transitory storage media devices.

As examples, in accordance with some implementations, the physical, non-transitory storage media devices may include one or more of the following: semiconductor storage devices, memristor-based devices, magnetic storage devices, phase change memory devices, a combination of devices of one or more of these storage technologies, storage devices for other storage technologies, and so forth. Moreover, in accordance with some implementations, the physical, non-transitory storage media devices may be volatile memory devices, non-volatile memory devices, or a combination of volatile and non-volatile memory devices. In accordance with some implementations, the non-transitory storage media devices may be part of storage arrays, as well as other types of storage subsystems.

The node 120, in accordance with example implementations, may be a computer platform (e.g., a blade server, a laptop, a router, a rack-based server, a gateway, a supercomputer and so forth), a subpart of a computer platform (e.g., a compute node corresponding to one or multiple processing cores of a blade server), or multiple computer platforms (e.g., a compute node corresponding to a cluster). Some of the nodes 120 may be compute nodes, and one or multiple nodes 120 may be administrative nodes, in accordance with example implementations. In accordance with some implementations, the node 120 may be a cluster.

As depicted in FIG. 1, in accordance with example implementations, a given node 120-1 may include one or multiple processing cores 124 (e.g., one or multiple central processing unit (CPU) semiconductor packages, one or multiple CPU cores, and so forth), which execute machine-executable instructions 136 (or "software") for purposes of forming one or more software components. As examples, these components may include one or multiple applications 128, one or multiple processes 144, one or multiple threads 148 of the processes 144, an operating system 159, one or multiple containers, one or multiple virtual machines, and so forth. In accordance with example implementations, in the execution of the machine-executable instructions 136, the processing core(s) 124 may, through a network interface 125 of the node 120-1, access the memory pool 104. As also depicted in FIG. 1, in accordance with some implementations, the node 120-1 may have a local memory 132 that stores the machine-executable instructions 136, data 140, and so forth. Moreover, in accordance with example implementations, other nodes 120 of the computer system 100 may have a similar architecture and similar components to the illustrated node 120-1. In accordance with example implementations, software components illustrated on the node 120-1 may be distributed components, such as, for example, the operating system 159 may be a component of a distributed operating system (i.e., an operating system that is distributed among the nodes 120), the applications 128 may be components of distributed applications, and so forth.

In accordance with example implementations, the memory manager 160 performs memory management for the computer system 100, i.e., allocates unused memory from the memory pool 104 to entities of the computer system 100, deallocates memory to return memory back to the memory pool 104, and manages access to the memory pool 104. For the particular implementation that is illustrated in FIG. 1, the memory manager 160 is part of the node 120-1 and may be part of the operating system 159. In accordance with some implementations, the operating system 159 may be a distributed operating system that is distributed among multiple nodes 120. As such, in accordance with example implementations, multiple nodes 120 may have operating system 159 components and corresponding memory manager 160 components. Therefore, in general, a "memory manager" refers to a single or distributed entity to manage memory, where the "managing" may include one or multiple of the following: allocating memory, deallocating memory, managing requests to access memory, and performing virtual-to-physical address translations. Moreover, in accordance with further implementations, the memory manager 160 (e.g., the memory manager of an HPC environment) may be part of the memory fabric, e.g., a single or distributed entity that is part of the network fabric 121 and/or memory pool 104.

As part of the memory management, the memory manager 160 allocates memory for entities of the computer system 100 from unused memory of the centralized memory pool 104, deallocates memory that is no longer being used to return the memory to the unused memory portion of the memory pool 104, and manages virtual-to-physical memory address translations for memory accesses (e.g., read and write accesses). In accordance with some implementations, the memory manager 160 employs a superset memory lane-based virtualization and within this virtualization, the memory manager 160 may employ another virtual memory management scheme (e.g., a page table-based memory management scheme). Pursuant to the memory lane-based virtualization, the memory manager 160 allocates flat, virtual hierarchical memory lane structures 108 (called "memory lane structures 108" herein) for entities of the computer system 100. In accordance with example implementations, the memory manager 160 may allocate a memory lane structure 108 for an entity in response to a memory allocation request. In this context, an "entity" refers to any hardware or software component of the computer system 100 that may provide a request to access the memory pool 104. As examples, the entities may include applications 128, threads 148, processes 144, containers, virtual memories, nodes 120, and so forth.

A memory allocation request, in accordance with some implementations, may be submitted by the entity (e.g., submitted by the entity executing machine executable instructions that generate the memory allocation request) or may be submitted on behalf of an entity (e.g., submitted by a compiler). In response to an allocation request, the memory manager 160 allocates memory for the entity. The allocated memory may be a memory lane structure 108 or one or multiple memory sublanes of an existing memory lane structure 108. In accordance with some implementations, the memory lane structure 108 may be invisible to the entity, as the allocation request may result in the memory manager 160 providing a contiguous range of allocated virtual memory addresses (corresponding to the allocated memory lane structure 108 or allocated sublane(s)) to the entity. In accordance with further implementations, the memory manager 160 may allocate a given memory lane structure 108 for a specific component (e.g., a computer node 120 or application executing on the computer node 120) and allocate sublanes of the memory lane structure 108 to different subcomponents (e.g., threads, processes, applications and so forth) of the component.

As a specific example, in accordance with some implementations, the memory manager 160 may allocate a memory lane structure 108 for an application 128; child sublanes of the memory lane structure 108 for processes 144 of the application; and grandchild sublanes of the memory lane structure 108 for threads 148 of the processes 144. In accordance with example implementations, an allocation to a particular entity involves the memory manager 160 assigning a particular range of contiguous virtual memory addresses corresponding to a particular main memory lane or memory sublane of the memory lane structure 108. A requestor may submit a memory access request (e.g., a read request or write request) to an allocated portion of memory. The memory access request may include a command (e.g., a read or write command) and a virtual memory address within the corresponding allocated range of contiguous virtual memory addresses. The memory manager 160 may, based on the virtual memory address, identify a targeted main memory lane or sublane, as further described herein, and translate the virtual memory address into a corresponding physical memory address.

In accordance with some implementations, the memory manager 160 or distributed component of the memory manager 160 may be formed from machine-executable instructions 136 that are executed by one or multiple processing cores 124 on a particular node 120. In accordance with example implementations, the memory manager 160 use data structures, such as directed acyclic graphs (DAGs) that are represented by DAG data 184, for purposes of managing virtual-to-physical memory address translations using hashes and probabilistic filters, as further described herein.

In general, in accordance with some implementations, the memory lane structure 108 is a virtualized representation of a corresponding physical memory space. This physical memory space may correspond to multiple, non-contiguous physical memory addresses. Although the physical memory addresses for a given memory lane structure 108 may be noncontiguous, the memory lane structure 108 represents a corresponding contiguous set of virtual memory addresses. As such, the memory lane structure 108 may be viewed as being nonlinear, or "flat." As depicted by the varying width and length dimensions of the memory lane structures 108 as depicted in FIG. 1, the granularities of the memory lane structures 108 may vary. As examples, in accordance with some implementations, a particular memory lane structure 108 may correspond to a certain access size (e.g., a word, a double word, and so forth). Moreover, the sizes and/or structures of the memory lane structures 108 may vary, in accordance with example implementations.

Figure 2:
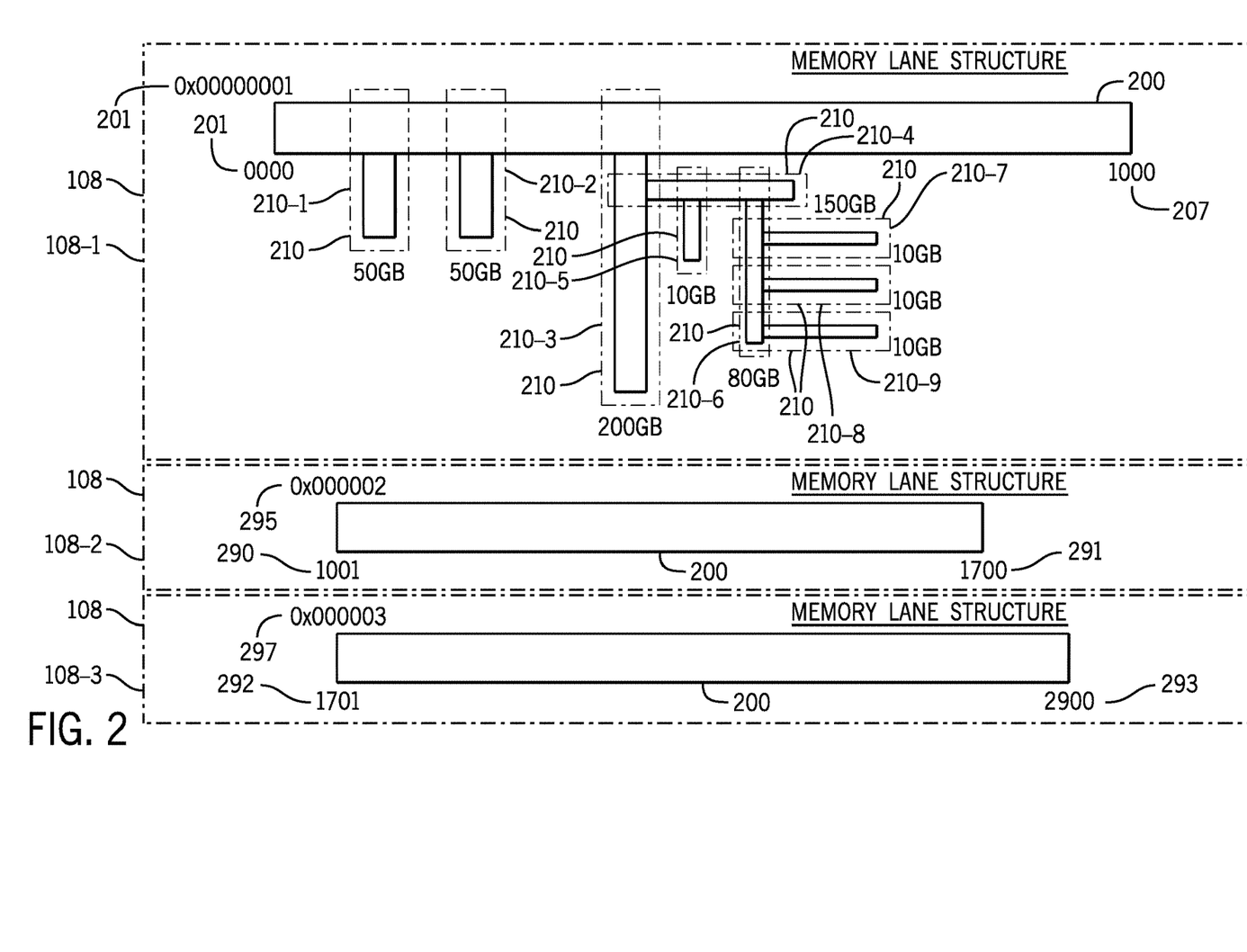
FIG. 2 is a detailed view of virtual hierarchical memory lane structures according to an example implementation.

FIG. 2 illustrates example memory lane structures 108-1, 108-2 and 108-3, in accordance with example implementations. Referring to FIG. 2, for this example, the memory lane structures 108-1, 108-2 and 108-3 have associated virtual memory sizes of 1000 gigabytes (GB), 1700 GB and 1200 GB, respectively. In accordance with example implementations, each memory lane structure 108-1, 108-2 and 108-3 has a main memory lane 200, and the main memory lane 200 has a size equal to the size of its memory lane structure and corresponds to the range of contiguous virtual memory addresses associated with its memory lane structure.

The memory lane structure 108 may contain one or multiple memory lanes, in accordance with example implementations. In the example implementation depicted in FIG. 2, the memory lanes 108-2 and 108-3 have a single memory lane, i.e., a single main memory lane 200. The memory lane structure 108-1 has multiple memory lanes that are arranged according to a hierarchical tree of nodes (where each node corresponds to a memory lane). The main memory lane 200 of the memory lane structure 108-1 corresponds to the root node of the hierarchical tree. For the example implementations of FIG. 2, the main memory lane 200 of the memory lane structure 108-1 has an allocation of 1000 GB and extends from a virtual memory address 201 of "0000" to an ending virtual memory address 207 of "1000." The memory lane structure 108-1 has the same allocation of virtual memory addresses "0000" to "1000." All of the virtual memory addresses of the memory lanes of the memory lane structure 108-1 are allocated from this 1000 GB assigned to the memory lane structure 108-1. More specifically, for this example, the memory lane structure 108-1 has nine memory lanes other than the main memory lane 200, which are referred to as "sublanes" herein: sublanes 210-1, 210-2, 210-3, 210-4, 210-5, 210-6, 210-7, 210-8 and 210-9.

As noted above, the memory lane structures 108-2 and 108-3 for this example each have a single main memory lane 200. The main memory lane 200 of each of the memory lane structures 108-2 and 108-3 have the same size and are allocated the same range of virtual memory addresses as their corresponding memory lane structures. For the specific example, the main memory lane 200 of the memory lane structure 108-2 extends from a virtual memory address 290 of "1001" to a virtual memory end address 291 of "1700," thereby corresponding to a virtual memory space size of 1700 GB. The main memory lane 200 of the memory lane structure 108-3 extends from a starting address 292 of "1701" to an ending address 293 of "2900," thereby corresponding to a virtual memory space of 1200 GB.

The memory lane structure 108-1 begins at a virtual memory address 201 of "0000" and ends at virtual memory address 207 of "1000". As depicted in FIG. 2, in accordance with this example implementation, the 200 GB child memory lane 210-3 is further subdivided to create additional child, grandchild and great grandchild lanes from the memory lane 210-3. More specifically, 150 GB of contiguous virtual memory space of the memory lane 210-3 is reserved to create a child lane 210-4 from the parent memory lane 210-3. As depicted in FIG. 2, 10 GB of the memory lane 210-4 is reserved from the memory lane 210-4 to create a memory lane 210-5, which is a child of the memory lane 210-4. Moreover, 80 GB of the memory lane 210-4 is reserved from the memory lane 210-4 to create a child memory lane 210-6.

Figure 3:
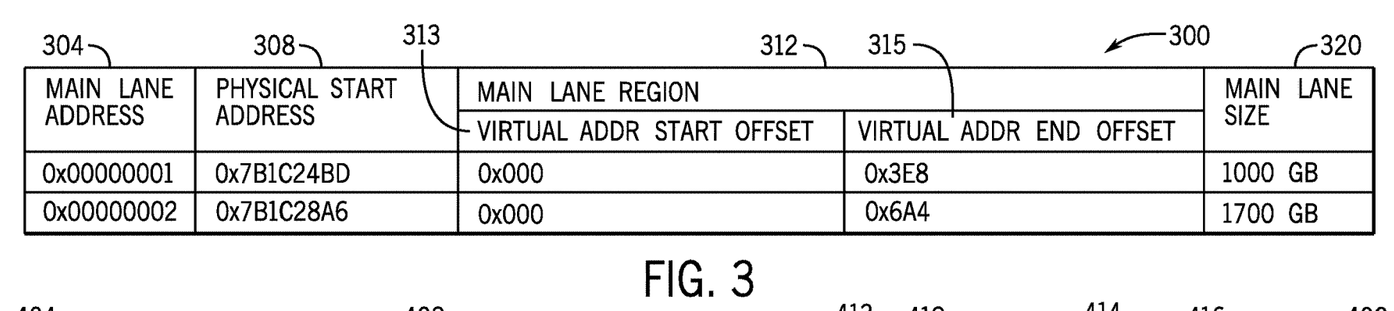
FIG. 3 is a table depicting features of main memory lanes of virtual hierarchical memory lane structures of FIG. 2 according to an example implementation.

As depicted in FIG. 2, the tree structure may be extended, as shown by child memory lanes 210-7, 210-8 and 210-9 being created from the parent memory lane 210-6. As depicted in the example of FIG. 2, 10 GB for each of the memory lanes 210-7, 210-8 and 210-9 are reserved from the memory lane 210-6. Referring to FIG. 3 in conjunction with FIG. 2, for this particular example, a table 300 depicts characteristics of the main memory lanes 200 for memory lane structures 108-1 (row 307) and 108-2 (row 309). The main memory lane for the memory lane structure 108-1 has a lane identification (ID) of "0x0000001" (where the prefix "0x" denotes a hexadecimal representation), and a physical starting address 308 of "0x7B1C24BD." A virtual main lane region starts from an offset of "0x000" and ends at a virtual offset of "0x3E8" (i.e., spans a virtual memory address range of "1000," which corresponds to a main lane size 320 of 1000 GB. The main memory lane for the memory lane structure 108-2 has a lane identification (ID) of "0x00000002", and a physical starting address 308 of "0x7B1C28A6" A virtual main lane region starts from an offset of "0x000" and ends at a virtual offset of "0x6A4" (i.e., spans a virtual memory address range of "1700," which corresponds to a main lane size 320 of 1700 GB). For this example, the physical memory addresses are contiguous in that the physical start address of the main lane 108-2 has a difference of 1001 from the physical start address of the main lane 108-1 to account for the 1000 GB size of the main lane 108-1. In accordance with further example implementations, the physical memory addresses for a given memory lane structure 108 (and corresponding main memory lane 200) may not be contiguous, although the virtual memory addresses for the memory lane structure (and corresponding main memory lane 200) are contiguous.

Referring to FIG. 2 in conjunction with FIG. 1, the main memory lane is a parent to the child memory sublanes 210-1, 210-2 and 210-3, which have sizes of 50 GB, 50 GB and 200 GB, respectively. Accordingly, virtual memory address space from the main memory lane 200, is reserved for the memory sublanes 210-1, 210-2 and 210-3. In other words, 50 GB of contiguous virtual memory space from the 1000 GB of contiguous virtual memory space allocated to the main memory lane 200 is reserved for the memory sublane 210-3. Moreover, 50 GB from the 1000 GB of contiguous virtual memory space is reserved for the memory sublane 210-1, and an additional 50 GB from the 1000 GB of contiguous virtual memory space is reserved for the memory sublane 210-2. The memory sublane 210-3 is a parent to the child memory sublane 210-4, which has a size of 150 GB. Accordingly, virtual memory address space from the child memory sublane 210-3 is reserved for the child sublane, i.e., 150 GB from the 200 GB allocated for the child memory lane 210-3 is reserved for the child memory lane 210-4.

The memory sublane 210-4 is a parent to child memory sublanes 210-5 and 210-6, which have sizes of 10 GB and 80 GB, respectively. Accordingly, virtual memory address space from the memory sublane 210-4 is reserved for the memory sublanes 210-5 and 201-6. In other words, 10 GB of contiguous virtual memory space from the 150 GB of contiguous virtual memory space allocated to the memory sublane 210-4 is reserved for the memory sublane 210-5, and 80 GB from the 150 GB of contiguous virtual memory space is reserved for the memory sublane 210-6. The memory sublane 210-6 is a parent to child memory sublanes 210-7, 210-8 and 210-9, which each have a size of 10 GB. Accordingly, virtual memory address space from the memory sublane 210-6 is reserved for the memory sublanes 210-7, 210-8 and 210-9. In other words, 10 GB of contiguous virtual memory space from the 80 GB of contiguous virtual memory space allocated to the memory sublane 210-6 is reserved for each of the memory sublanes 210-7, 210-8 and 210-9.

In accordance with example implementations, the memory manager 160 identifies, or addresses, a specific memory sublane by identifying the sublane's parent memory lane and identifying the child of the parent memory lane, which corresponds to the specific memory sublane. The address of a memory sublane may be represented by the following tuple: (parent identifier, child identifier). Using the memory lane structure 108-1 as an example, depending on the particular memory sublane 210 being addressed, the parent identifier corresponds to the main memory lane 200 or one of the memory sublanes 210 that are parents, such as the memory sublane 210-3, 210-4 or 210-6. Moreover, the due to the hierarchical ordering of the memory sublanes 210, the parent identifier may be a nested address that is represented by an ordered sequence of memory lane addresses, i.e., a tuple. As such, in accordance with example implementations, the parent identifier may be a single value (for the case in which the parent is a main memory lane 200) or, for the case in which the parent is a memory sublane, may be a tuple-ordered values that represent progression through the hierarchical tree from the root node (the main memory lane 200) to the parent. Accordingly, in general, the number of values of the parent identifier tuple increases with the distance of the parent from the root node (the main memory lane 200) of the hierarchical tree. The child identifier, in accordance with example implementations, is single value that identifies a specific child of the parent.

Figure 4:
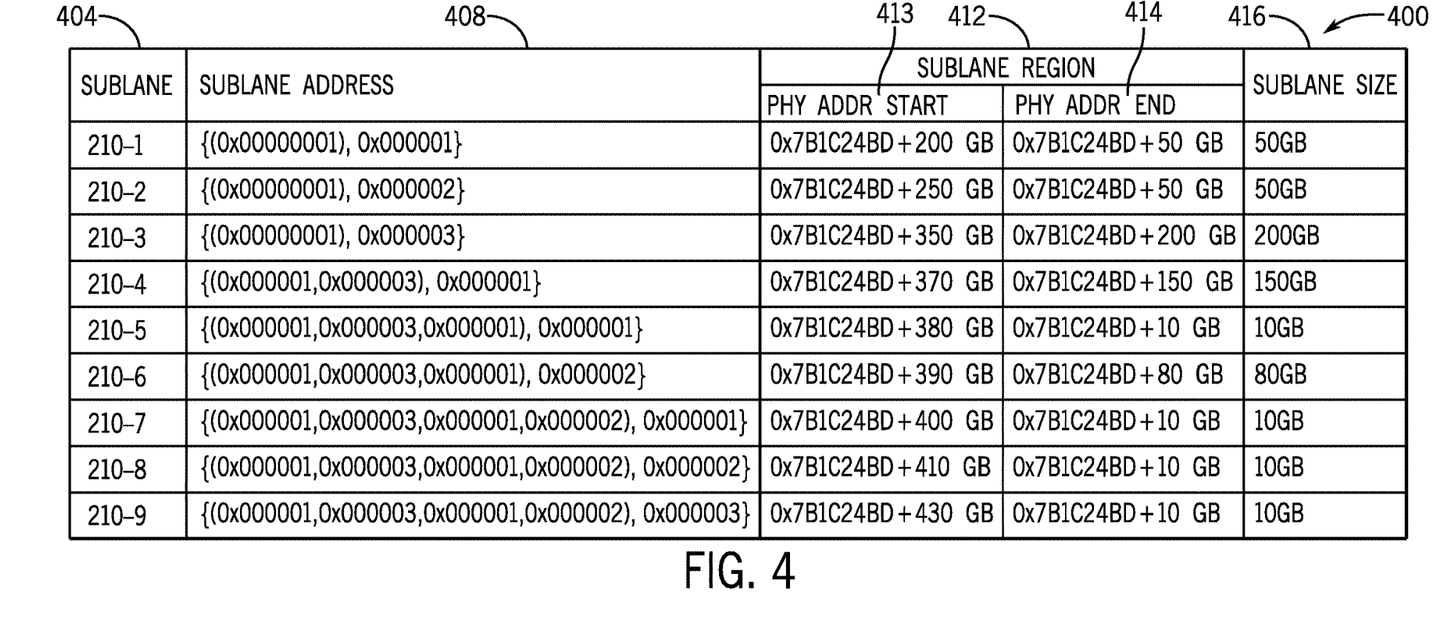
FIG. 4 is a table depicting features of memory sublanes of a virtual hierarchical memory lane structure of FIG. 2 according to an example implementation.

FIG. 4 depicts a table 400 illustrating characteristics of the memory sublanes 210 of the memory lane structure 108-1, including a column 210 that contains the sublane identifier tuple for each memory sublane 210. Referring to FIG. 4 in conjunction with FIGS. 2 and 3, as noted above, the parent identifier of the sublane identifier tuple may be a single value or may be a multiple value tuple, reflecting the potential nesting of the memory sublanes 210.

For example, in accordance with an example implementation, for the memory sublane 210-1, the main memory lane 200 is the parent. The memory sublane has a sublane identifier of "{(0x00000001), 0x000001}," which represents a parent identifier 230 of "0x00000001" (i.e., the sublane 210-1 has the address of the main memory lane 200) and a child identifier of "0x000001."

As also depicted in table 400, for this example, the memory sublane 210-1 has a size of 50 GB (column 416). The memory space for the memory sublane 210-1 is reserved from its parent, main memory lane 200 (which has a size of 1000 GB for this example). Stated differently, the 50 GB contiguous range of virtual memory addresses for the memory sublane 210-1 are removed (or "carved out") from the 1000 GB range of contiguous virtual memory addresses that are allocated for the main memory lane 200. The memory sublane 210-1 has a starting physical memory address (column 413 of table 400) of 0x7B1C24BD+200 GB (i.e., a starting physical memory address offset by 200 GB from the starting physical memory address memory address of the main memory lane 200). The memory sublane 210-1 has an ending physical memory address (column 414 of table 400) of 0x7B1C24BD+200 GB+50 GB (i.e., an ending physical memory address offset by 50 GB from the starting physical memory address). Although for this example and the other examples depicted in conjunction with table 40, the physical memory addresses for the memory sublanes are contiguous, in accordance with further implementations, a given memory sublane 210 may correspond to noncontiguous physical memory addresses spaces.

As another example, the memory sublane 210-4 has a sublane identifier of {(0x00000001, 0x000003), 0x000001}. The memory sublane 210-4 is a child of memory sublane 210-3, the parent. The memory sublane 210-3 (the parent) is not the main memory lane 200, but rather, the memory sublane 210-3 is a child of the main memory lane 200. Because the memory sublane 210-3 is a child of the main memory lane, the parent identifier is represented by a two value tuple of "(0x00000001, 0x000003)." This two value parent identifier tuple represents the hierarchy of the parent memory sublane 210-3. The first value of "0x00000001" of the parent identifier tuple represents the address of the main memory lane 200 (i.e., the parent of the memory sublane 210-3), and the second value of "0x000003" of the parent identifier tuple represents the address of the memory sublane 210-3.

As also depicted in table 400, for this example, the memory sublane 210-4 has a size of 150 GB (column 416). The 150 GB memory space for the memory sublane 210-4 is reserved from its parent, memory sublane 210-3 (which has a size of 200 GB for this example). The memory sublane 210-4 has a starting physical memory address (column 413 of table 400) of 0x7B1C24BD+370 GB (i.e., a starting physical memory address offset by 370 GB from the starting physical memory address memory address of the main memory lane 200). The memory sublane 210-4 has an ending physical memory address (column 414 of table 400) of 0x7B1C24BD+370 GB+150 GB (i.e., an ending physical memory address offset by 150 GB from the starting physical memory address).

As another example, the memory sublane 210-8 has a sublane address of "{(0x00000001, 0x000003, 0x000001, 0x000002), 0x000002}." The memory sublane 210-8 is a child of the memory sublane 210-6, the parent. The memory sublane 210-6 (the parent) is a child of the memory sublane 210-4, the memory sublane 210-4 is a child of the memory sublane 210-3, and the memory sublane 210-3 is a child of the main memory lane 200. Accordingly, for this example, the parent identifier is a four value tuple of (0x00000001, 0x000003, 0x000001, 0x000002). The first value of "0x00000001" of the parent identifier tuple represents the address of the main memory lane 200 (i.e., the parent of the memory sublane 210-3). The second value of "0x000003" of the parent identifier tuple represents the address of the memory sublane 210-3 (i.e., the parent of the memory sublane 210-4). The third value of "0x000001" of the parent identifier tuple represents the address of the memory sublane 210-6 (i.e., the parent of the memory sublane 210-8).

In accordance with some implementations, the memory manager 160 may use a directed acyclic graph (DAG) to translate convert a virtual memory address into a physical memory address and establish the relationships between the memory lanes. More specifically, referring to FIG. 5 in conjunction with FIGS. 1 and 2, in accordance with some implementations, the memory manager 160 may use a DAG 504 for each memory lane structure 108. In general, each memory lane structure 108 is associated with a particular contiguous range of virtual memory addresses, and the memory manager 160 may select the appropriate DAG 504 based on the virtual memory address that is submitted as part of a request to access the memory pool 104.

Figure 5:
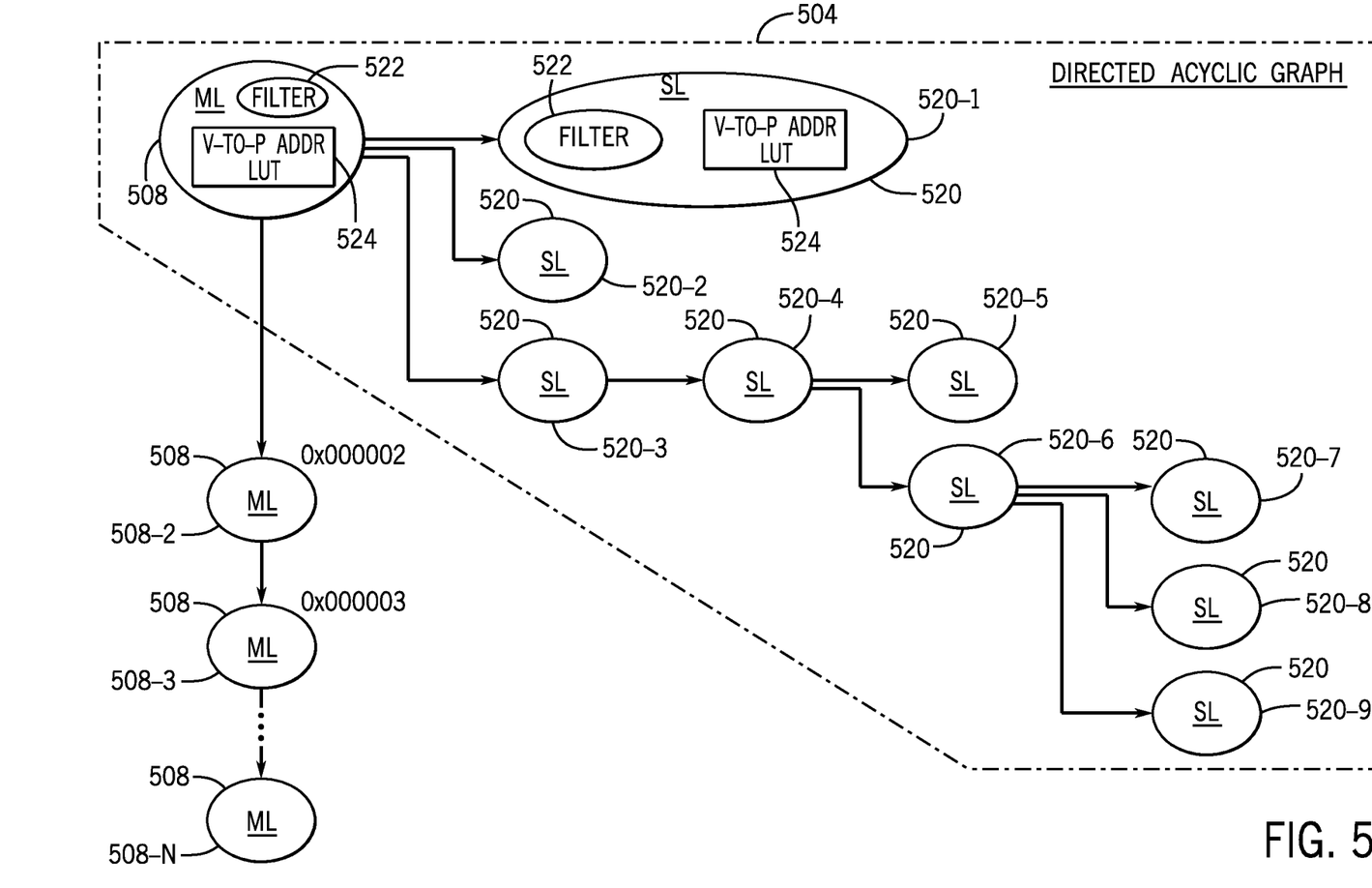
FIG. 5 is an illustration of a directed acyclic graph (DAG) used by a memory manager of the computer system of FIG. 1 to determine a physical memory address for a virtual memory address according to an example implementation.

For the particular example that is depicted in FIG. 5, the DAG 504 corresponds to the memory lane structure 108-1 and as such, is used by the memory manager 160 to translate a virtual memory address that falls within the range of contiguous virtual memory addresses that are assigned to the memory lane structure 108-1. Each DAG 504 includes a root node 508 that corresponds to the main memory lane 200. If the corresponding memory lane structure 108 has memory sublanes 210 (which is the case for example memory lane structure 108-1), then the DAG 504 has additional nodes 520 that correspond to memory sublanes 210 and arranged in a tree according to the hierarchical order of the memory lane structure 108. For the example of FIG. 5, the DAG 504 contains nodes 520-1, 520-2, 520-3, 520-4, 520-5, 520-6, 520-7, 520-8 and 520-9 that correspond to the memory sublanes 210-1, 210-2, 210-3, 210-4, 210-5, 210-6, 210-7, 210-8 and 210-9, respectively, of the memory lane structure 108-1.

Each node of the DAG 504, in accordance with some implementations, is associated with a set of virtual memory addresses and contains a virtual-to-physical memory address look-up table 524 that sets forth physical memory addresses for the associated set of virtual memory addresses. For example, the root node 508 may be associated with a look-up table 524 that contains the virtual-to-physical memory address translations for the virtual memory addresses of the main memory lane 200, which are not reserved for any of the memory sublanes 210. As another example, the node 520-1 may be associated with a look-up table 524 that contains the virtual-to-physical memory address translations for the virtual memory addresses of the memory sublane 210-1.

For purposes of efficiently traversing the DAG to find the appropriate node and associated look-up table 524, in accordance with some implementations, the memory manager 160 takes advantage of probabilistic filters 522 (e.g., Bloom filters) that are associated with the nodes. For example, in accordance with some implementations, the memory manager 160 may apply multiple hash functions to a given virtual memory address to produce multiple corresponding hash values. The memory manager 160 may then apply the hash values to one or multiple filters 522 for purposes of identifying the node (and main memory lane or sublane) that is associated with the given virtual memory address so that the associated look-up table 524 may be identified. For example, the memory manager 160 may first apply the hash values to a filter 522 associated with the root node 508 for purposes of determining whether it is likely that the given virtual memory address is in the look-up table 508 associated with the root node 508, including ruling out this possibility.

If the filter results rule out the given virtual memory address being in the look-up table 508 associated with the root node 508, then the memory manager 160 may apply the hash values to the filter(s) 522 of one or multiple child nodes 520 of the root node 508. In accordance with example implementations, the memory manager may use the filter 522 of a node 520 to determine whether it is likely that the given virtual memory address is in the look-up table associated with the node 522 or in the look-up tables 522 associated with the node's descendants, including ruling out this possibility. Therefore, by applying the hash values to one or multiple filters 522 of the DAG 504 and traversing the DAG 504 accordingly, the memory manager 504 may efficiently locate the node 508 or 520 and its associated look-up table 524 so that the given virtual memory address may be translated into the corresponding physical memory address.

In this context, a "hash" (also called a "hash value" herein) is produced by the application of a cryptographic hash function to a value (e.g., an input, such as an image). A "cryptographic hash function" may be a function that is provided through the execution of machine-readable instructions by a processor (e.g., one or multiple central processing units (CPUs), one or multiple CPU processing cores, and so forth). The cryptographic hash function may receive an input, and the cryptographic hash function may then generate a hexadecimal string to match the input. For example, the input may include a string of data (for example, the data structure in memory denoted by a starting memory address and an ending memory address). In such an example, based on the string of data the cryptographic hash function outputs a hexadecimal string. Further, any minute change to the input may alter the output hexadecimal string. In another example, the cryptographic hash function may be a secure hash function (SHA), any federal information processing standards (FIPS) approved hash function, any national institute of standards and technology (NIST) approved hash function, or any other cryptographic hash function. In some examples, instead of a hexadecimal format, another format may be used for the string.

Figure 6:
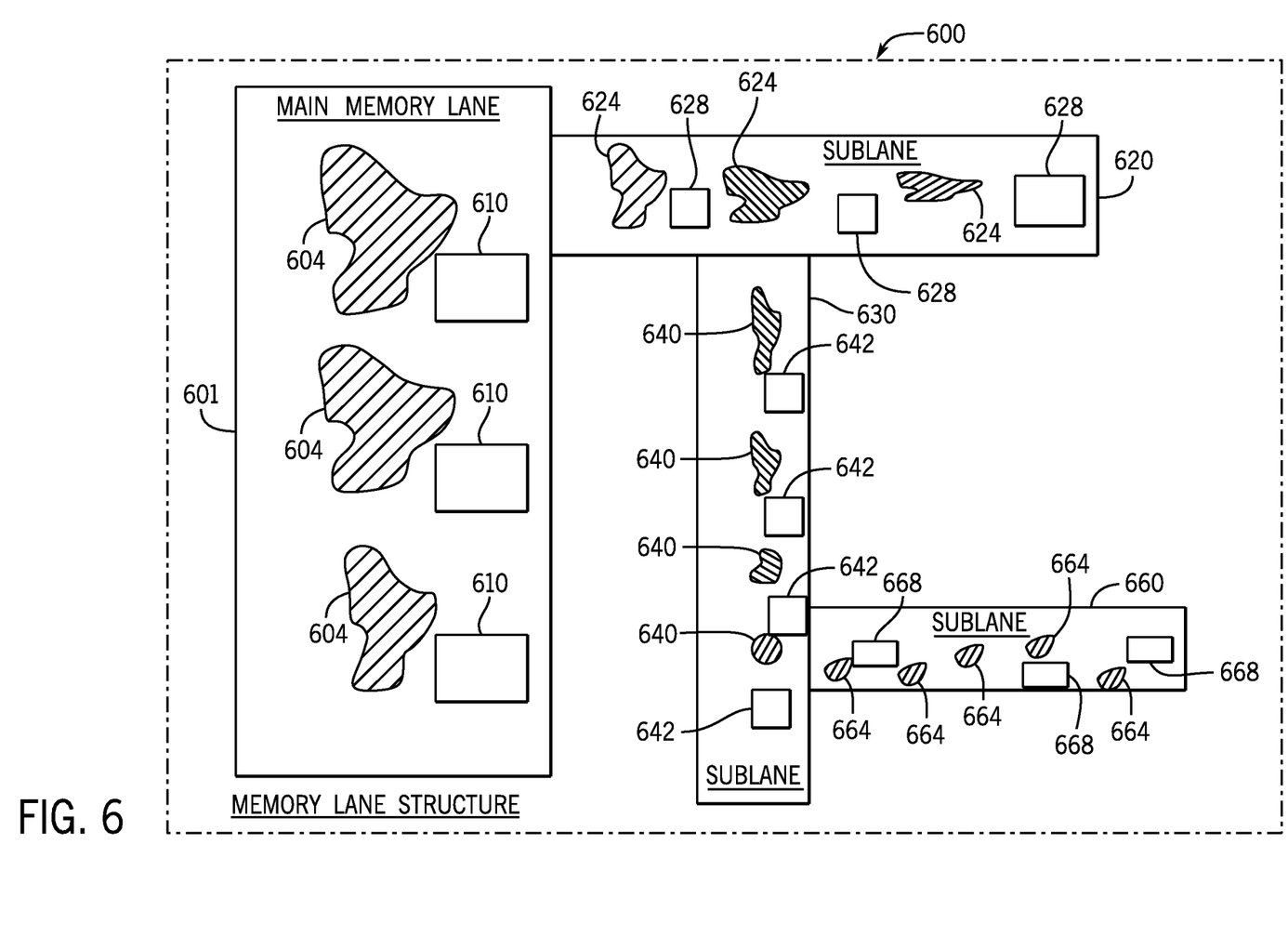
FIG. 6 is an illustration of a hierarchical memory lane structure used for brain lesion treatment analysis according to an example implementation.

The memory lane structures 108 may be useful for purposes of easily allocating relatively large virtual memory spaces from corresponding nonlinear physical memory spaces. Such allocation may be beneficial for big data applications that store and analyze patterns, including applications involving computational biology, analysis medical treatments for brain lesions or studying galaxies or cosmos objects. The memory lane structures 108 allow data pertaining to shapes to be stored in a data dependent manner, and allow the data to be retrieved and analyzed in an efficient manner. FIG. 6 illustrates an example use of a memory lane structure 600 associated with drug treatments of brain lesions. Referring to FIG. 6, for this example, the memory lane structure 600 may be used by one or multiple entities that process brain lesion imaging and analysis. A main memory lane 601 of the memory lane structure 600 may be associated with images 604 of lesions associated with a particular set of treatment parameters (method of treatment, drugs used, treatment time, and so forth) and corresponding metadata 610 representing the treatment parameters. A memory sublane 620, which is a child of the main memory lane 601, may contain lesion images 624 and associated metadata 628 associated with a treatment over an additional time. As an example, the lesion images in the sublane 620 may, for example, be associated with a further set of parameters (prolonged testing, different drugs, different treatment methodology, and so forth). Likewise, the treatment parameters may be further refined, resulting in lesion images 640 and associated metadata 642 in a sublane 630 that is a child of the sublane 620. Treatment parameters may further be refined, resulting in a sublane 660 that is a child of the sublane 630 and contains lesion images 640 and associated metadata 668.

As can be seen for the example of FIG. 6, in accordance with example implementations, a child memory lane may store dependent content for a parent memory lane. Moreover, in accordance with example implementations, the memory lane structure may be used to store data-dependent contents in non-volatile memory. As such, the data-dependent content stored in/retrieved from a given memory sublane may be a specifically-addressable unit of data, in accordance with example implementations. More specifically, in accordance with some implementations, instead of using files and/or filenames to reference units of data, memory lane identifiers for these units of data may be used. For example, specific data may be stored or retrieved in a given memory sublane by referring to a {parent identifier, child identifier} address for the memory sublane, as described above. Therefore, a request submitted by a requestor to store or retrieve specific data in the memory lane structure may, in accordance with example implementations, specify a memory sublane address of the data, instead of specifying, for example, a filename. As such, a content addressable memory (CAM) functionality may be achieved using the memory lane structure-based memory management that is described herein and without using relatively more expensive CAM hardware.

Therefore, in accordance with some implementations, a requestor may submit a request that contains an address that identifies a specific parent memory lane and identifies a specific child memory lane. Moreover, in accordance with further implementations, a requestor may submit a request that contains a virtual address that does not refer to the memory lane structure (i.e., the request does not identify a specific memory lane and as such, the request neither identifies a parent memory lane nor a child memory lane). For these implementations, the memory manager identifies a particular parent memory lane and child memory lane based on the virtual address.

Figure 7:
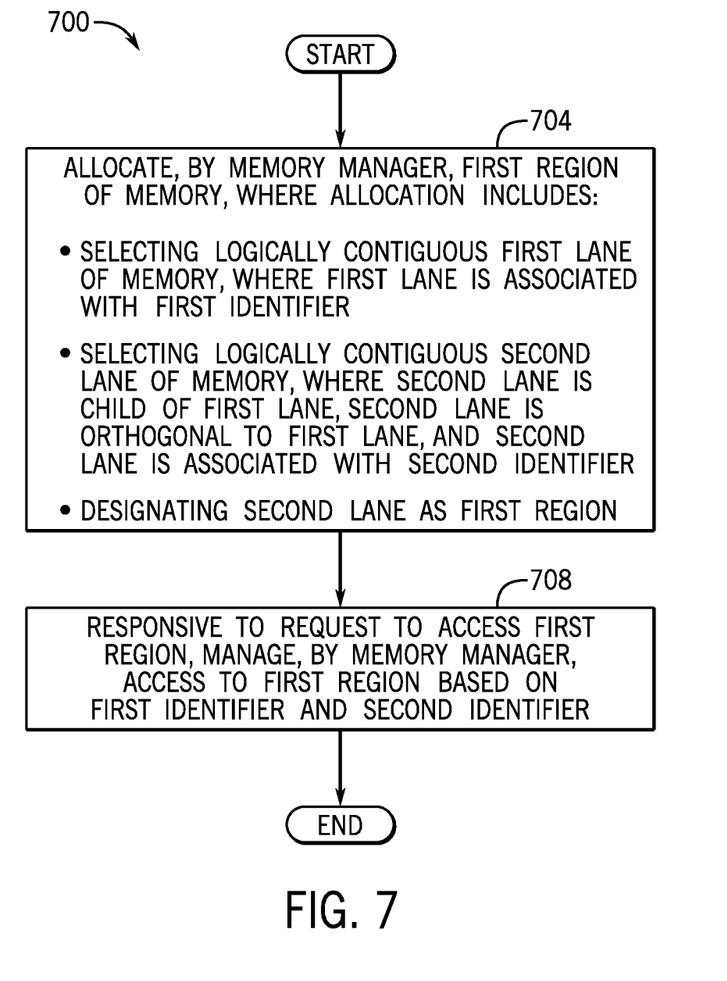
FIG. 7 is a flow diagram depicting a technique to allocate and manage orthogonal memory lanes according to an example implementation.

Referring to FIG. 7, in accordance with example implementations, a technique 700 includes allocating (block 704), by a memory manager, a first region of a memory. The allocation includes selecting a logically contiguous first lane of the memory. The first lane is associated with a first identifier. The allocation further includes selecting a logically contiguous second lane of the memory. The second lane is a child of the first lane, and the second lane is orthogonal to the first lane. The second lane is associated with a second identifier. The technique 700 includes, responsive to a request to access the first region, managing (block 708), by the memory manager, the access to the first region based on the first identifier and the second identifier.

Figure 8:
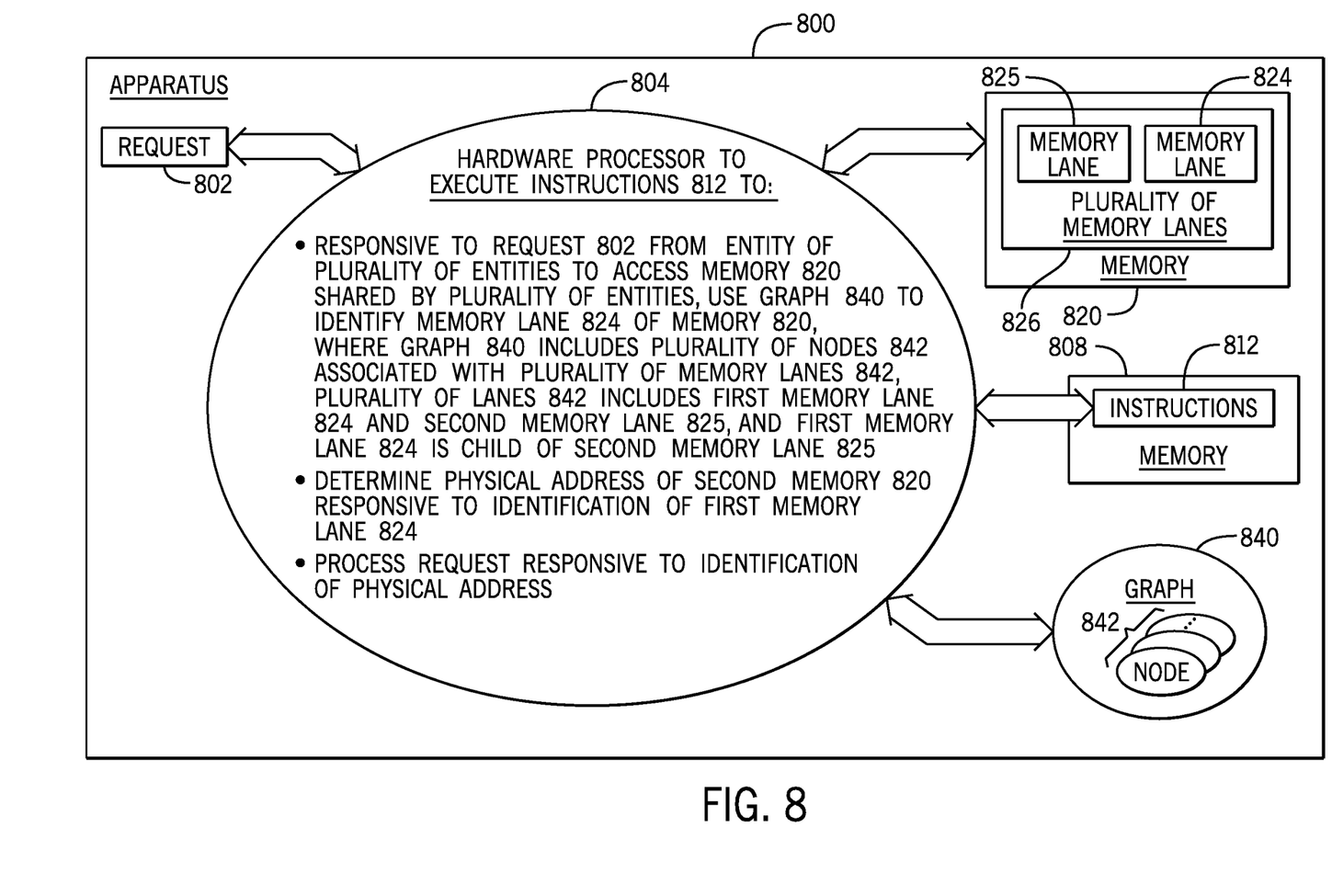
FIG. 8 is a hardware processor to use a graph to identify a memory lane, determine a physical memory address of a memory location responsive to the identification of the memory lane and process a request responsive to the identification according to an example implementation.

Referring to FIG. 8, in accordance with example implementations, an apparatus 800 includes a hardware processor 804 and a memory 808 to store instructions 812 that, when executed by the hardware processor 804, cause the hardware processor 804 to, responsive to a request 802 from an entity of a plurality of entities, access a memory 808 that is shared by the plurality of entities. The hardware processor 804 uses a graph 840 to identify a memory lane 824 of the memory 820. The graph 840 includes a plurality of nodes 842, which are associated with a plurality 826 of memory lanes. The plurality 826 of memory lanes includes the memory lane 824 and the memory lane 825. The memory lane 824 is a child of the memory lane 825. The instructions 812, when executed by the hardware processor 804, further cause the hardware processor 804 to determine a physical memory address of the memory 820 responsive to the identification of the memory lane 824. Moreover, the instructions 812, when executed by the hardware processor 804, further cause the hardware processor 804 to process the request 802 responsive to the identification of the physical memory address.

Figure 9:
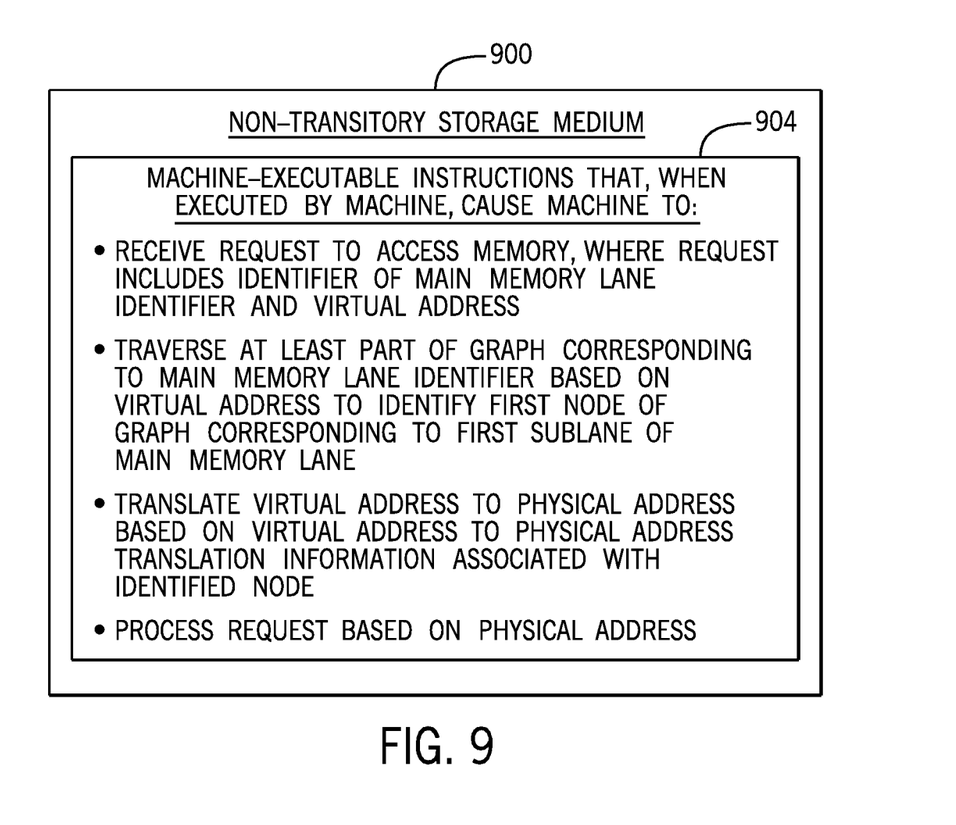
FIG. 9 is an illustration of a non-transitory storage medium that stores machine-executable instructions that, when executed by a machine, cause the machine to process a request to access a memory using a graph according to an example implementation.

Referring to FIG. 9, in accordance with example implementations, a non-transitory storage medium 900 stores machine-readable instructions 904 that, when executed by a machine, cause the machine to receive a request to access a memory. The request includes a main memory lane identifier and a virtual memory address. The instructions 904, when executed by the machine, further cause the machine to traverse at least part of a graph that corresponds to the main memory lane identifier based on a virtual memory address to identify a first node of the graph, which corresponds to a first sublane of the main memory lane. The instructions 904, when executed by the machine, further cause the machine to translate the virtual memory address to a physical memory address based on virtual memory address to physical memory address translation information that is associated with the identified node. The instructions 904, when executed by the machine, further cause the machine to process the request based on the physical memory address.

In accordance with example implementations, the allocation by the memory manager further includes reserving a portion of the first lane for the second lane. A particular advantage is that the memory may be allocated and managed in a manner that is efficient for large scale memory requestors.

In accordance with example implementations, the allocation further includes selecting a logically contiguous third lane of the memory. The third lane is a parent of the first lane, the third lane is orthogonal to the first lane, and the third lane is associated with a third identifier. The management by the memory manager further includes managing access to the first region based on the first identifier, the second identifier and the third identifier. A particular advantage is that the memory may be allocated and managed in a manner that is efficient for large scale memory requestors.

In accordance with example implementations, the allocation by the memory manager further includes allocating, by the memory manager, a second region of the memory. This allocation includes the memory manager selecting the first lane and selecting a logically contiguous third lane. The third lane is a child of the first lane, the third lane is orthogonal to the first lane, and the third lane is associated with a third identifier. The allocation by the memory manager further includes the memory manager designating the third lane as the second region. The memory manager may further, responsive to a request to access the second region, manage the access to the second region based on the first identifier and the third identifier. A particular advantage is that the memory may be allocated and managed in a manner that is efficient for large scale memory requestors.

In accordance with example implementations, the memory manager may allocate a third region of the memory. The allocation of the third region may include, in the first lane, selecting the third lane, and selecting a logically contiguous fourth lane. The fourth lane is a child of the third lane, the fourth lane is orthogonal to the third lane, and the fourth lane is associated with a fourth identifier. The allocation by the memory manager may further include the memory manager designating the fourth lane as the third region. The management by the memory manager may also include, responsive to a request to access the third region, managing the access to the third region based on the first identifier, the third identifier and the fourth identifier. A particular advantage is that the memory may be allocated and managed in a manner that is efficient for large scale memory requestors.

In accordance with example implementations, the first lane is a parent to children lanes. The second lane includes a first child of the children lanes. The memory manager may further manage access to a second region corresponding to a second child lane of the children lanes other than the second lane based on the first identifier and an identifier that is associated with the second child lane. A particular advantage is that the memory may be allocated and managed in a manner that is efficient for large scale memory requestors.

In accordance with example implementations, managing access to the second region includes the memory manager using a graph to determine a physical memory address corresponding to the second region based on the first identifier and the second identifier. A particular advantage is that the memory may be allocated and managed in a manner that is efficient for large scale memory requestors.

In accordance with example implementations, managing the access to the first region includes traversing, by the memory manager, a directed acyclic graph based on the first identifier and the second identifier to identify a node of the directed acyclic graph. Managing the access further includes, based on the translation information that is associated with the node, determining a physical memory address corresponding to the request. A particular advantage is that the memory may be allocated and managed in a manner that is efficient for large scale memory requestors.

In accordance with example implementations, a request is received from an entity of a memory driven computing (MDC) system. The entity includes a node of the MDC system, a processing core of the node, a process of the node, or a thread of the node. A particular advantage is that the memory may be allocated and managed in a manner that is efficient for large scale memory requestors.

In accordance with example implementations, a request is received from an entity of a cluster. The entity includes a node, a processing core of the node, a process of the node, or a thread of the node. A particular advantage is that the memory may be allocated and managed in a manner that is efficient for large scale memory requestors.

In accordance with example implementations, the request contains a virtual memory address. Managing the access includes identifying the second lane based on the first identifier and the second identifier. Managing the address further includes, responsive to the identification of the second lane, applying a memory management policy to determine a physical memory address based on the virtual memory address. The request is processed base on the physical memory address. A particular advantage is that the memory may be allocated and managed in a manner that is efficient for large scale memory requestors.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
a first memory that stores instructions; and
one or more hardware processors that, when executing the instructions, cause the apparatus to:
   allocate a hierarchical memory structure of a virtual memory by:
      designating a second lane of contiguous virtual memory addresses of the virtual memory addresses as being a child of a first lane of contiguous virtual memory addresses of the virtual memory addresses;
      designating the second lane as being orthogonal to the first lane; and
      allocating the hierarchical memory structure of the virtual memory based on the designations for the second lane; and
   responsive to a request to access a given virtual memory address, translate the given virtual memory address into a physical memory address by:
      traversing a graph corresponding to the hierarchical memory structure by:
         identifying a first node of the graph corresponding to the first lane;
         identifying a second node of the graph corresponding to the second lane; and
         accessing a virtual-to-physical memory address translation associated with a subgraph of the graph containing the second node; and
      translating the given virtual memory address into the physical memory address based on the virtual-to-physical memory address translation.

2. The apparatus of claim 1, wherein the allocating further comprises reserving a portion of the first lane for the second lane.

3. The apparatus of claim 1, wherein:
allocating the hierarchical memory structure further comprises:
   selecting a third lane of contiguous memory addresses of the virtual memory;
   designating the third lane as being a child of the second lane;
   designating the third lane as being orthogonal to the second lane; and
   allocating the hierarchical memory structure of the virtual memory based on the designations for the third lane; and
traversing the graph further comprises:
   identifying a third node of the graph corresponding to the third lane, wherein the third node is a child of the second node; and
   accessing a lookup table associated with the third node to retrieve the virtual-to-physical memory address translation.

4. The apparatus of claim 1, wherein:
the graph further comprises a third node corresponding to a third lane;
the third lane is a child of the first lane; and
the traversing further comprises:
   determining, based on a probabilistic filter associated with the third node that the virtual-to-physical memory address translation is not within a subgraph of the graph containing the third node.

5. The apparatus of claim 1, wherein the traversing further comprises:
determining, based on a probabilistic filter associated with the second node whether the virtual-to-physical memory address translation is within the subgraph; and
traversing the subgraph responsive to determining, based on the probabilistic filter, that the virtual-to-physical memory address translation is within the subgraph.

6. The apparatus of claim 5, further comprising:
responsive to determining, based on the probabilistic filter, that the virtual-to-physical memory address translation is within the subgraph, searching a virtual-to-physical memory address lookup table associated with the second node for the given virtual memory address.

7. The apparatus of claim 5, wherein the probabilistic filter comprises a Bloom filter.

8. The apparatus of claim 1, wherein traversing the graph comprises traversing a directed acyclic graph corresponding to the hierarchical memory structure.

9. The apparatus of claim 1, further comprising:
receiving the request from an entity of a memory driven computing (MDC) system, wherein the entity comprises a node of the MDC system, a processing core of the node, a process of the node, or a thread of the node.

10. The apparatus of claim 1, further comprising:
receiving the request from an entity of a cluster, wherein the entity comprises a node, a processing core of the node, a process of the node, or a thread of the node.

11. The apparatus of claim 1, further comprising:
receiving, by the memory manager, a second request;
identifying, by the memory manager, the second lane based on a first identifier of the second request identifying the first lane and a second identifier of the second lane identifying the second lane;
accessing, by the memory manager, the second lane responsive to the second request.

12. An apparatus comprising:
a first memory that stores instructions; and
a hardware processor that, responsive to executing the instructions and responsive to a request from an entity of a plurality of entities to access a virtual memory address of a second memory shared by the plurality of entities:
   traverses a graph corresponding to a hierarchical memory structure associated with the second memory, wherein the traversing comprises:
      identifying a first node of the graph corresponding to a first lane of contiguous virtual memory addresses of the hierarchical memory structure; and
      identifying a second node of the graph corresponding to a second lane of contiguous virtual memory addresses of the hierarchical memory structure, wherein the second lane is a child of the first lane;

accessing a virtual-to-physical memory address translation associated with a subgraph of the graph containing the second node;

determines a physical memory address corresponding to the given virtual memory address based on the virtual-to-physical memory address translation; and provides the entity access to the determined physical memory address.

13. The apparatus of claim 12, wherein the graph comprises a directed acyclic graph.

14. The apparatus of claim 12, wherein the traversing further comprises:

determining, based on a probabilistic filter associated with the second node whether the virtual-to-physical memory address translation is within the subgraph; and traversing the subgraph responsive to determining, based on the probabilistic filter, that the virtual-to-physical memory address translation is within the subgraph.

15. The apparatus of claim 14, wherein the probabilistic filter comprises a Bloom filter.

16. A non-transitory storage medium that stores machine-readable instructions that, when executed by a machine, cause the machine to:

receive a request to access a hierarchical memory structure of orthogonal memory lanes, wherein the request comprises a virtual memory address;

translate the virtual memory address to a physical memory address based on a graph representing a hierarchical arrangement of virtual-to-physical memory address translation tables corresponding to a hierarchy of the hierarchical memory structure by:

determining a hash of the virtual memory address;

based on the hash and a filter corresponding to a first node of the graph corresponding to a first memory lane of the memory lanes, identifying a first subgraph of the graph containing the first node;

responsive to the identification of the first subgraph, searching at least one virtual-to-physical memory address translation table of the virtual-to-physical memory address translation tables associated with the first subgraph to determine the physical memory address; and translating the virtual memory address to the determined the physical memory address; and process the request based on the translated physical memory address.

17. The storage medium of claim 16, wherein:

the hierarchical memory structure comprises a first memory lane of contiguous virtual memory addresses corresponding to a first node of the graph;

the hierarchical memory structure further comprises a sublane of contiguous virtual memory addresses corresponding to a second node of the graph;

the second memory lane is a child of the first memory lane;

the second node is a child of the first node; and the instructions, when executed by the machine, cause the machine to:

traverse the graph to identify the second node based on the virtual memory address; and search a virtual-to-physical memory address translation table of the plurality of virtual-to-physical memory address translation tables associated with the second node to determine the physical memory address.

18. The storage medium of claim 16, wherein the instructions, when executed by the machine, further cause the machine to:

based on the hash and a filter corresponding to a second node of the graph and corresponding to a second memory lane of the memory lanes, bypass searching virtual-to-physical memory address translation tables associated with nodes of a second subgraph containing the second node.

19. The storage medium of claim 16, wherein the graph comprises a directed acyclic graph.

20. The storage medium of claim 16, wherein the instructions are associated with a distributed operating system.

* * * * *